June 2, 1953     H. E. CLEMENTS     2,640,867

INSULATOR COMBINED WITH LIVE LINE LINKS

Filed Nov. 20, 1948

INVENTOR

HOWARD E. CLEMENTS

BY E. M. Harrington

ATTORNEY

Patented June 2, 1953

2,640,867

UNITED STATES PATENT OFFICE 2,640,867

INSULATOR COMBINED WITH LIVE LINE LINKS

Howard E. Clements, Webster Groves, Mo., assignor to James R. Kearney Corporation, St. Louis, Mo., a corporation of Missouri Application November 20, 1948, Serial No. 61,259

3 Claims. (Cl. 174—139)

This invention relates generally to live line links adapted for use in the construction and maintenance of electrical power distribution systems, and more specifically to live line links which are so constructed and arranged that live line tools may be conveniently and securely associated therewith for use in taking up line tension, the predominant object of the invention being to provide an improved live line link which may be used as a linkage between a strain insulator and a dead end clamp and which includes means engageable by a live line tool whereby the live line tool may be conveniently employed in taking up line tension.

Heretofore it has been the general practice in the construction of electric power lines, to either connect dead end clamps directly to strain insulators, or to employ for such connection the conventional linkage, such as the eye-clevis or the eye-socket. In accordance with such practice no provisions were made for the employment of live line, dead end tools, other than tools which engaged the dead end clamps and which required special complicated fittings, or the application of wire grips on the line conductors which introduces the possibility of slippage and injury to the line conductors. The live line link of this invention was devised to overcome the above disadvantages and it provides an item of pole line hardware of such character and usefulness that utility engineers may design and build electric power lines that will be more economical and safer to maintain with live line tools than were the power lines heretofore known. This is of great importance because the high continuity of service demanded by electric power companies requires live line maintenance on many of their primary feeds as well as on the higher voltage lines.

Figure 1:
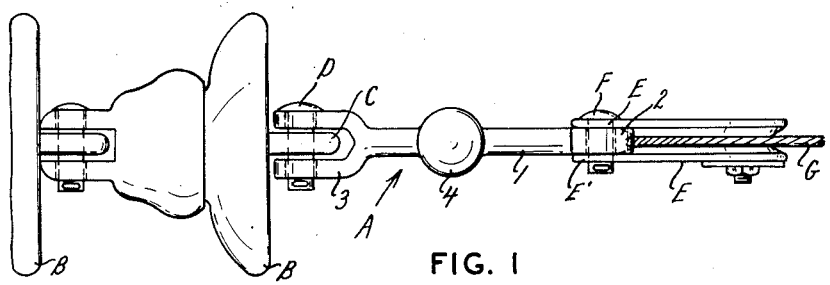
Fig. 1 is a plan view illustrating the improved live line link in association with a strain insulator, a strain clamp, and a line conductor.
Figure 2:
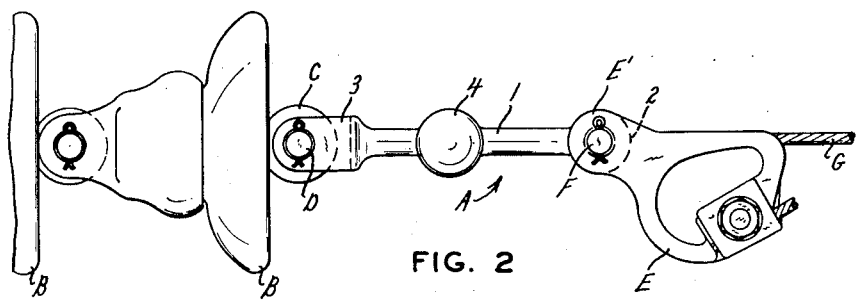
Fig. 2 is a side elevation of the assembly shown in Fig. 1.

In the drawing, wherein is shown for purposes of illustration, merely, several embodiments of the invention. A designates, in Figs. 1 and 2, the improved live line link generally. The live line link A comprises a shank portion 1 which may be of any desired cross-sectional shape, said shank portion being provided with an eye 2 at one of its ends and a clevis 3 at its opposite end. In Figs. 1 and 2 the clevis of the live line link A is attached to a strain insulator B which is shown as being of the disk type, said insulator having a portion C which is extended between the spaced legs of the clevis 3 with a headed pin D being extended through alined openings formed through said spaced legs of said clevis and through said insulator portion C for securing the live line link A to the insulator B. The opposite end of the live line link is attached to a dead end clamp E which is of well known construction, the eye of said live line link being disposed between spaced portions E' of the dead end clamp E and a headed pin F being extended through alined openings formed through said spaced portions of said dead end clamp and through the opening of the eye of the live line link. In Figs. 1 and 2 a line conductor G is shown which is associated with the dead end clamp in the usual and well known manner.

The improved live line link of the present invention is provided with an abutment 4 which forms a part of the shank portion 1 thereof. This abutment 4 is shown in the drawing as a sphere but, obviously, it may be of various other shapes as desired. Preferably, the abutment is an integral part of the shank portion of the live line link, but it may be in the form of a separate element which is suitably secured to said shank portion of the live line link.

The live line link of the present invention is used as a linkage between a strain insulator and a dead end clamp, and its abutment 4 provides means whereby live line tools may be caused, in a convenient and secure manner, to engage the live line link when it is desired to take up line tension in constructing or repairing an electric power line. Through the use of the live line link of this invention dead end tools may be quickly and securely put in use thereby saving time and promoting safety. Also, the use of the improved live line link of this invention eliminates the use of wire grips which occasionally slip and do injury to line conductors, and its use eliminates the need for special fittings on dead end tools so that said tools will engage various types of dead end clamps. Additionally, the use of the improved live line link extends the live line conductor a greater and safer distance from the pole on dead end and running corners, and it makes possible the design of safer and more versatile live line and dead end tools.

Figure 3:
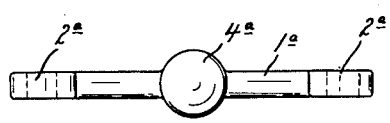
Fig. 3 illustrates a modified form of the improved live line link of this invention.
Figure 4:
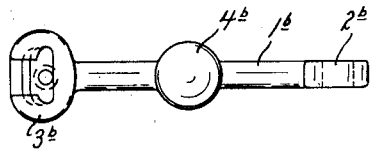
Fig. 4 illustrates another modified form of the improved live line link of this invention.

The modified forms of the invention shown in Figs. 3 and 4 each comprises a live line link having a shank portion provided with an abutment, the shank portion in Fig. 3 being designated by the reference character 1a and the abutment in that view being designated by the reference character 4a, while in Fig. 4 the shank portion is designated by the reference character 1b and the abutment in Fig. 4 is designated by the reference character 4b. However, the modified forms of the invention illustrated by Figs. 3 and 4 differ from the form of the invention shown by Figs. 1 and 2 in that the shank portion 1a of the live line link of Fig. 3 is provided with eyes 2a at its opposite ends, while the shank portion 1b of the live line link of Fig. 4 is provided with an eye 2b at one of its ends and a socket 3b at its opposite end which is adapted to engage a portion of a strain insulator.

I claim:

1. In combination with a strain insulator and a strain clamp, a live line link comprising an elongated unidirectional shank portion having means at its opposite ends which engage said strain insulator and said strain clamp for permanent assembly therewith, and an enlarged abutment on said shank portion between the opposite ends thereof which is engageable by a tool for subjecting said live line link to movement longitudinally of its major axis so as to take up tension in a line conductor with which the assembly of said live line link, said strain insulator, and said strain clamp is associated.

2. In combination with a strain insulator and a strain clamp, a live line link comprising an elongated unidirectional shank portion having means at its opposite ends which engage said strain insulator and said strain clamp for permanent assembly therewith, and an enlarged abutment integrally formed on said shank portion between the opposite ends thereof which is engageable by a tool for subjecting said live line link to movement longitudinally of its major axis so as to take up tension in a line conductor with which the assembly of said live line link, said strain insulator, and said strain clamp is associated.

3. In combination with a strain insulator and a strain clamp, a live line link comprising an elongated unidirectional shank portion having means at its opposite ends which engage said strain insulator and said strain clamp for permanent assembly therewith, and an enlarged substantially spherical abutment integrally formed on said shank portion between the opposite ends thereof which is engageable by a tool for subjecting said live line link to movement longitudinally of its major axis so as to take up tension in a line conductor with which the assembly of said live line link, said strain insulator, and said strain clamp is associated.

HOWARD E. CLEMENTS.

References Cited in the file of this patent

UNITED STATES PATENTS

| Number | Name | Date |
|---|---|---|
| 1,282,481 | Sonneborn | Oct. 22, 1918 |
| 1,317,605 | Thompson | Sept. 30, 1919 |
| 1,980,370 | Bennett | Nov. 13, 1934 |
| 2,319,587 | Conrad | May 18, 1943 |
| 2,360,019 | Ryan | Oct. 10, 1944 |

FOREIGN PATENTS

| Number | Country | Date |
|---|---|---|
| 183,912 | Germany | Mar. 12, 1907 |